Patented Nov. 25, 1952

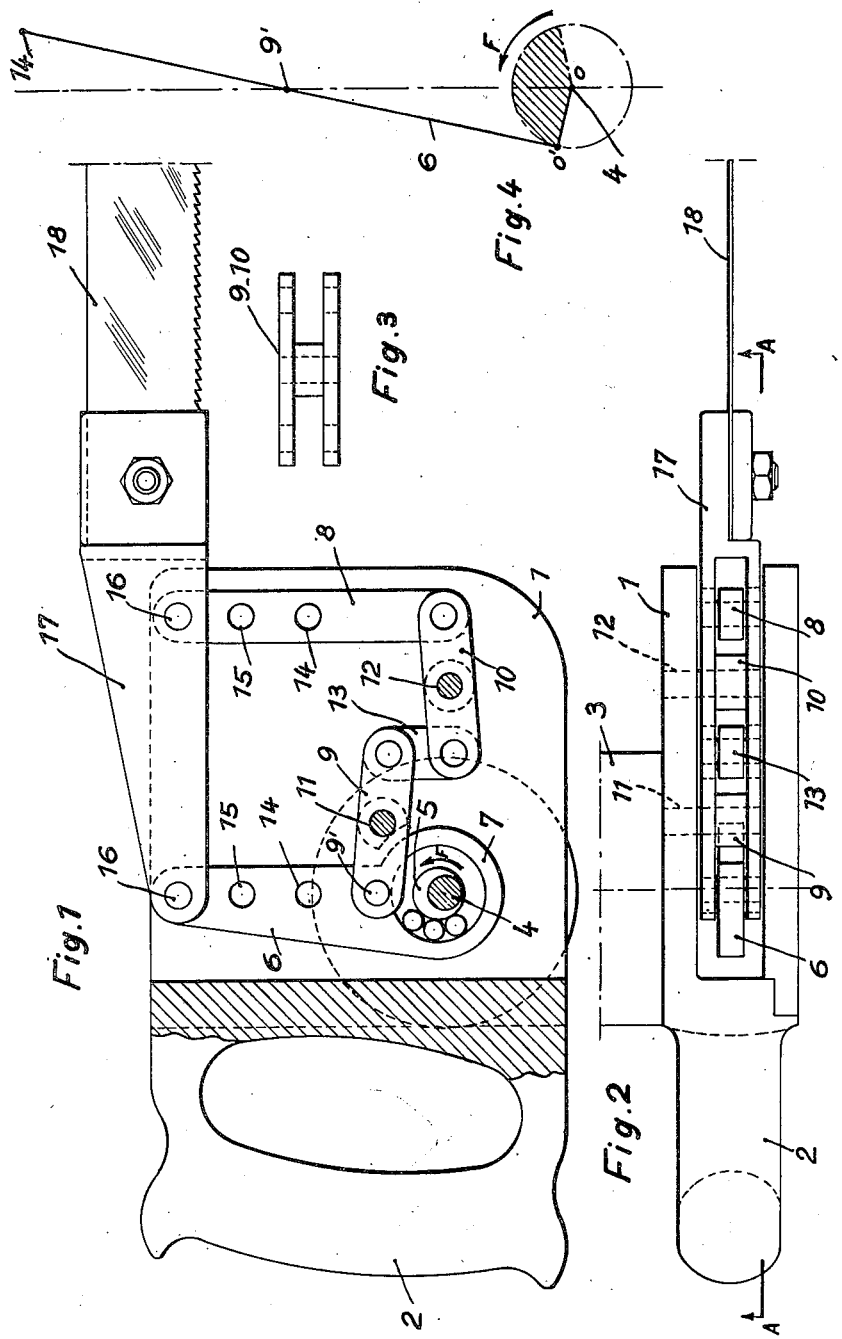

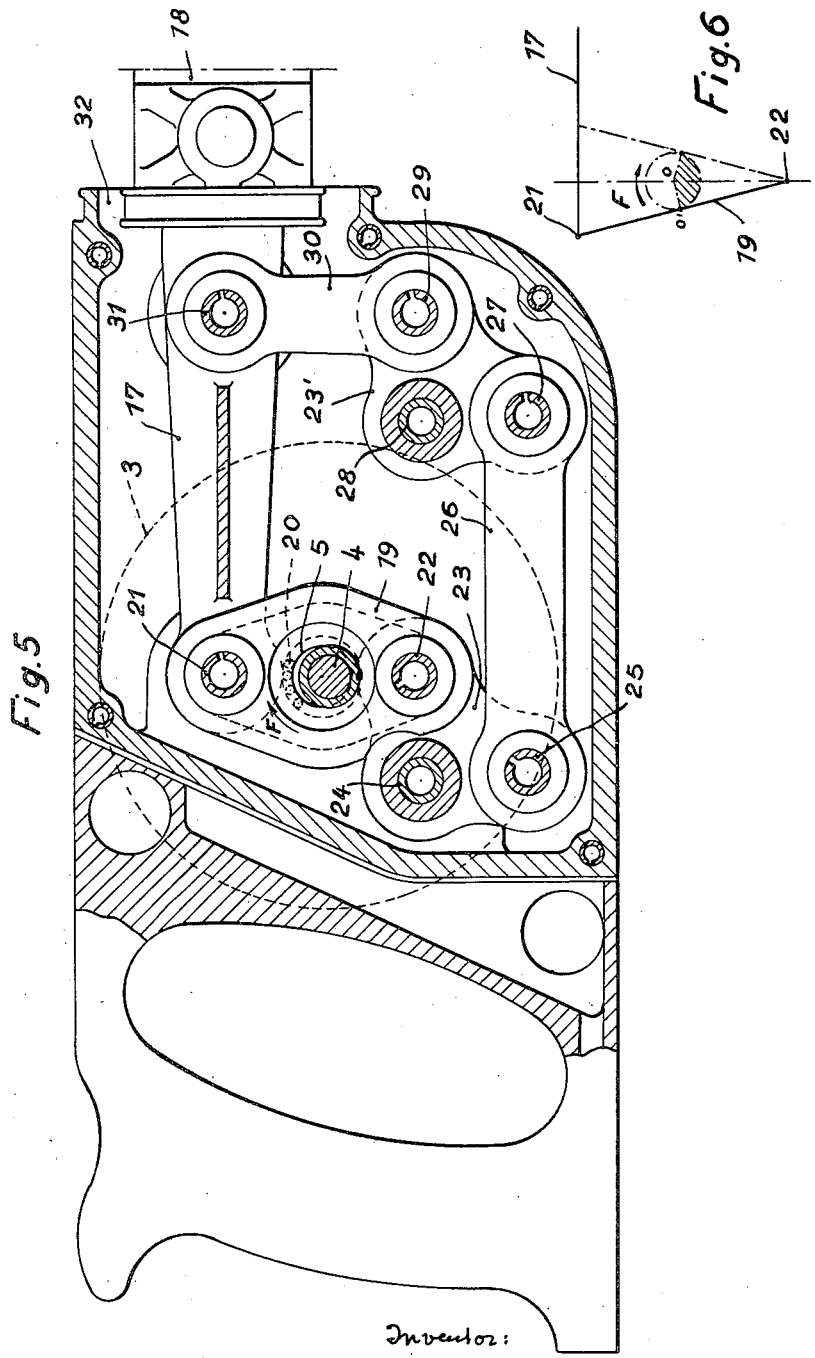

2,619,133

UNITED STATES PATENT OFFICE 2,619,133

POWER-DRIVEN SAWING MACHINE HAVING A STRAIGHT BLADE MOVING IN A CYCLIC PATH

Gaston Raphaël Hubert Vulliet-Durand, Paris, France

Application November 8, 1946, Serial No. 708,522
In France December 6, 1945

4 Claims. (Cl. 143—68)

The present invention relates to saws.

Up to the present time there have in general been three distinct types of sawing processes:

(1) a sawing process where the cutting tooth moves continuously along a circular path, as, for example, in the case of disc saws;

(2) a sawing process where the cutting tooth travels continuously along a path which is straight at the cutting portion of the path, as, for example, in the case of band saws; and (3) a sawing process where the cutting tooth reciprocates along a straight line path, as, for example, in the case of hand saws.

It is an object of the present invention to provide a sawing apparatus which operates differently from any of the above listed sawing processes to produce advantages incapable of being produced by these conventional sawing processes.

It is a further object of the present invention to provide a sawing apparatus capable of operating at a high speed.

Another object of the present invention is to provide a sawing apparatus which fatigues the operator to a very small extent, if at all.

An additional object of the present invention is to provide a saw blade which moves through a very small distance during the sawing operation so that it is capable of cutting sections almost as large as the length of the saw blade.

In accordance with the present invention, the sawing is carried out by giving to a non-circular saw blade a movement, of great velocity, which causes each cutting tooth to describe a closed curve of circular, elliptical or oval shape. The apparatus of the present invention includes, in addition to the saw blade, a frame carrying the saw blade and capable of being held in the hand of the user, and an electric motor, or other suitable drive means, carried by the frame and driving the saw blade. This saw blade moves only to a relatively small extent, and the handle of the apparatus only serves the purpose of guiding the blade during the sawing operations.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is an elevational view taken along line A—A of Fig. 2 in the direction of the arrows;

Fig. 2 is a top plan view of the apparatus illustrated in Fig. 1;

Fig. 3 is a plan view of a detail of the apparatus shown in Fig. 1;

Fig. 4 is a diagram illustrating the principle of operation of the saw illustrated in Figs. 1 and 2;

Fig. 5 is a partly sectional, side elevational view of an embodiment of the invention different from that shown in Figs. 1 and 2; and Fig. 6 is a diagram explanatory of the operation of the structure of Fig. 5.

Referring now to the drawings, there is illustrated in Figs. 1–4 a sawing apparatus capable of giving a quick return movement to the saw. As is shown in these figures, a frame 1 is provided with a handle 2 and carries an electric motor, or similar driving device 3, the shaft 4 of which carries an eccentric 5. This eccentric 5 may be formed integrally with the shaft 4 or otherwise fixedly connected thereto. The eccentric 5 engages roller bearings located within a circular opening in an end portion 7 of a connecting rod 6 so that the latter is reciprocated upon rotation of the shaft 4.

Pins 11 and 12 are parallel to each other and the shaft 4 and are fixedly mounted on the frame 1. Pivotally mounted on the pin 11 for turning movement about the axis thereof is a lever 9 which is pivotally connected by the pin 9' to the rod 6. Pivotally mounted on the pin 12 for turning movement about the axis thereof is a lever 10 which is pivotally connected at its right hand end, as viewed in Fig. 1, to a connecting rod 8. The levers 9 and 10 are interconnected by a link 13 which at its opposite ends is pivotally connected to these levers, as illustrated in Fig. 1. The connecting rods 6 and 8 are each formed with three bores 14, 15 and 16. Thus, there are provided three pairs of bores, and the support 17, to which the saw blade 18 may be removably connected, is selectively connectable to the pair of bores 14, the pairs of bores 15, or the pair of bores 16, as by having a pair of pins passing through one of these pair of bores and a pair of openings in the support 17. The support 17 is illustrated in Fig. 1 as being secured to the pair of bores 16, but it may be secured to either of the other two pairs of bores if the operation of the saw is to be changed, as described below.

The assembly of connecting rods 6 and 8 together with levers 10 and 11, link 13, and support 17 forms a deformable parallelogram and upon operation of the motor 3, the saw blade 18 will move in a vertical plane.

The saw teeth, in the particular example illustrated in Fig. 1, will each move through the same path as that which is described by either of the bores 16, and the same is true of the bores 14 or 15 if the support 17 is connected to these bores. This path is a closed curve, and the paths of the bores 14, 15 and 16 are different from each other so that a variation in the movement of the saw teeth is obtainable by changing the location of support 17. The vertical movement of the saw teeth will always be the same, that is, equal to twice the eccentricity of member 5, but the horizontal movement of the saw teeth will be different for each of the bores 14, 15 or 16. The parts are so designed that the bores 14 will give the saw teeth a movement in a horizontal direction which is equal to their movement in a vertical direction, and when support 17 is connected to rods 6 and 8 at bores 14 the saw teeth will move through a substantially circular path.

Each bore 15 is centrally located between the bores 14 and 16 so that the horizontal movement produced by the bores 16 is three times the horizontal movement of the bores 14, and the horizontal movement produced by bores 15 is two times the horizontal movement of the bores 14. When the support 17 is connected to rods 6 and 8 at the bores 15, or at the bores 16, the path of the saw teeth is elliptical, and when support 17 is connected to rods 6 and 8 at bores 15, the elliptical path will have a major axis which is twice its minor axis, while, when support 17 is connected to rods 6 and 8 at bores 16, the elliptical path has a major axis which is three times its minor axis. Thus, any one of the sets of bores 14, 15 or 16 may be used to obtain the best results for a given material which is to be sawed and for a given saw blade.

As is illustrated in Fig. 1, the saw blades 18, which are to be used in the apparatus of the present invention, have their teeth extending in a direction opposite to that of the teeth in conventional saw blades, so that the cutting takes place when the saw blade is pulled rather than when it is pushed. This eliminates any possibility of buckling of the saw blade, which is particularly significant when relatively long saw blades are used, and with the disclosed apparatus it is of particular advantage since it permits the forward edge of frame 1 to be used as a rest by placing the same against the material to be sawed, which greatly increases the ease of operation of the apparatus.

As is shown diagrammatically in Fig. 4, the apparatus of Figs. 1 and 2 produces a quick return movement. In this figure, the eccentricity of member 5 is illustrated on an enlarged scale as equal to the radius 0—0' revolving about the central axis 4. The connecting rod 6 and pivot points 9' and 14 thereof are diagrammatically illustrated in Fig. 4. The return movement of the saw blade takes place along the shaded part of the circle described by radius 0—0', while the cutting action takes place along the unshaded part of this circle.

The construction of the levers 9 and 10, which are identical, is illustrated in Fig. 3, where it is seen that these levers are made of opposite side pieces respectively located at one end thereof on opposite sides of the link 13 and at the other end thereof on opposite sides of connecting rod 6, in case of lever 9, and connecting rod 8, in the case of lever 10, as is also illustrated in Fig. 2 of the drawings.

The apparatus of Fig. 5 is different from that described above and is designed to produce a slow return motion for the saw teeth. According to this embodiment of the invention, the motor 3, shaft 4, and eccentric 5, are identical with the parts 3, 4 and 5 of the structure illustrated in Figs. 1 and 2. The eccentric 5 engages the roller bearings 20 in a bore of the connecting rod 19, the shaft 4 and the eccentric 5 therewith turning in the direction of the arrow F of Fig. 5. The connecting rod 19 is pivotally connected at 21 to the left end of the blade carrying support 17, as viewed in Fig. 5, this support carrying a saw blade 18, as illustrated. The connecting rod 19 is pivotally connected at 22 to one arm of a bell crank lever 23 which turns about the stationary member 24 fixedly mounted on the frame 32. The other arm of the bell crank lever 23 is pivotally connected at 25 to the left end, as viewed in Fig. 5, of a connecting rod 26, which is substantially parallel to support 17 and which is pivotally connected at 27 to an arm of bell crank lever 23' which turns about the axis of member 28 fixed to the frame 32. The other arm of bell crank lever 23' is pivotally connected at 29 to a connecting rod 30 which in turn is pivotally connected at 31 to the support 17, this connecting rod 30 being substantially parallel to the connecting rod 19.

Thus, the above-described assembly of members 19, 23, 26, 23', 30 and 17 forms a deformable parallelogram which moves the blade support 17, and the blade 18 therewith, in a vertical plane and through a closed path. The vertical extent of movement of the blade is twice the eccentricity of member 5, and, in the particular example illustrated, the horizontal movement of the blade is about twice that of the vertical movement. Thus, the path of each saw tooth is a substantially elliptical curve whose major axis is substantially twice that of its minor axis.

As is diagrammatically illustrated in Fig. 6, where the eccentricity of member 5 is shown on an enlarged scale as being the radius 0—0' forming a circle about the center 0, the return motion of the blade, indicated in the unshaded part of this circle, is larger than the cutting stroke, which is shown in the shaded part of this circle. The connecting rod 19 has been diagrammatically illustrated in Fig. 6 as moving between the solid and dot-dash line positions, this connecting rod 19 being diagrammatically shown in Fig. 6 as turning about point 22 and being pivotally connected at 21 to the support 17. The frame 32 of Fig. 5 is a closed housing having an oil bath therein to insure the best possible operation of the parts located in the housing. The opening of frame 32 through which the blade 17 passes is made fluid tight by a resilient member which is not illustrated in Fig. 5.

It will be understood that each of the elements described above, or two or more together, may also find a useful application in other types of saws differing from the types described above.

While the invention has been illustrated and described as embodied in saws adapted to move in closed paths it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Apparatus for moving a saw blade carrier in a cyclic path, comprising, in combination, a frame; a motor carried by said frame; a shaft driven by said motor; an eccentric fixed to said shaft for rotation therewith; a first connecting rod having one end operatively connected to said eccentric and having its other end pivotally secured to the saw blade carrier; a second connecting rod arranged substantially parallel to said first connecting rod and having one end pivotally secured to the saw blade carrier at a place spaced from said first connecting rod; and lever means pivoted to said frame and being pivotally connected to the other end of said second connecting rod and to said first connecting rod intermediately of the ends of the latter, whereby a deformable parallelogram is formed and a cyclic movement is imparted to the blade upon rotation of said shaft.

2. Apparatus for moving a saw blade carrier in a cyclic path, comprising, in combination, a frame; a motor carried by said frame; a shaft driven by said motor; an eccentric fixed to said shaft for rotation therewith; a first connecting rod formed with a plurality of openings, having one end operatively connected to said eccentric and having its other end pivotally secured to the saw blade carrier; a second connecting rod arranged substantially parallel to said first connecting rod and having one end pivotally secured to the saw blade carrier at a place spaced from said first connecting rod, said second connecting rod also being formed with a plurality of openings; and lever means pivoted to said frame and being pivotally connected to the other end of said second connecting rod and to said first connecting rod intermediately of the ends of the latter, the saw blade carrier being selectively supported on said connecting rods at said openings thereof so as to regulate the effective length of said connecting rods, whereby a deformable parallelogram is formed and a cyclic movement of a horizontally adjustable length is imparted to the blade upon rotation of said shaft.

3. Apparatus for moving a saw blade carrier in a cyclic path, comprising, in combination, a frame; a motor carried by said frame; a shaft driven by said motor; an eccentric fixed to said shaft for rotation therewith; a first connecting rod having one end operatively connected to said eccentric and being formed with a plurality of openings at one of which said first connecting rod is selectively and pivotally secured to the saw blade carrier; a second connecting rod formed with a plurality of openings at one of which said second connecting rod is selectively and pivotally secured to the saw blade carrier at a place spaced from said first connecting rod, said second connecting rod being substantially parallel to said first connecting rod; and lever means pivoted to said frame and being pivotally connected to the other end of said second connecting rod and to said first connecting rod intermediately of the ends of the latter, whereby a deformable parallelogram is formed and a cyclic movement of horizontally adjustable length is imparted to the blade upon rotation of said shaft.

4. Apparatus for moving a saw blade carrier in a cyclic path, comprising, in combination, a frame; a motor carried by said frame; a shaft driven by said motor; an eccentric fixed to said shaft for rotation therewith; a first connecting rod having one end operatively connected to said eccentric and having its other end pivotally secured to the saw blade carrier; a second connecting rod arranged substantially parallel to said first connecting rod and having one end pivotally secured to the saw blade carrier at a place spaced from said first connecting rod; a pair of levers pivoted to said frame, one end of each lever being pivotally secured to one of said connecting rods; and a connecting link pivotally connected to the other ends of said levers, whereby a deformable parallelogram is formed and a cyclic movement is imparted to the blade upon rotation of said shaft.

GASTON RAPHAËL HUBERT
VULLIET-DURAND.

REFERENCES CITED

The following references are of record in the file of this patent:

UNITED STATES PATENTS

| Number | Name | Date |
|---|---|---|
| 334,297 | Smith | Jan. 12, 1886 |
| 943,646 | Bradford et al. | Dec. 21, 1909 |
| 1,505,030 | Kentch | Aug. 12, 1924 |
| 1,636,729 | Yarrington | July 26, 1927 |
| 1,834,635 | Overall | Dec. 1, 1931 |
| 1,855,371 | Ungar | Apr. 26, 1932 |
| 2,239,681 | Marshall | Apr. 29, 1941 |
| 2,354,716 | Thrailkill | Aug. 1, 1944 |

FOREIGN PATENTS

| Number | Country | Date |
|---|---|---|
| 412,247 | France | Apr. 28, 1910 |